United States Patent
Linz et al.

(10) Patent No.: US 9,209,685 B2
(45) Date of Patent: Dec. 8, 2015

(54) VARIABLE RESISTANCE DEVICE FOR REDUCED POWER DISSIPATION IN DIMMER COMPATIBILITY CIRCUITS

(71) Applicant: Cirrus Logic, Inc., Austin, TX (US)

(72) Inventors: Alfredo R. Linz, Austin, TX (US); Shatam Agarwal, Austin, TX (US); Kan Wang, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 51 days.

(21) Appl. No.: 14/088,637

(22) Filed: Nov. 25, 2013

(65) Prior Publication Data

US 2015/0145438 A1    May 28, 2015

(51) Int. Cl.
    *H02M 5/42*      (2006.01)
    *H02M 3/156*     (2006.01)
    *H05B 37/02*     (2006.01)
    *H02M 7/04*      (2006.01)
    *H05B 33/08*     (2006.01)

(52) U.S. Cl.
    CPC .............. *H02M 3/156* (2013.01); *H02M 7/04* (2013.01); *H05B 33/0851* (2013.01); *H05B 37/0227* (2013.01)

(58) Field of Classification Search
    CPC ........................................................ G05F 1/12

USPC .......... 323/282, 288, 293, 294, 295, 296, 297, 323/298; 327/108, 109; 363/89
See application file for complete search history.

(56) References Cited

U.S. PATENT DOCUMENTS

| | | | |
|---|---|---|---|
| 6,433,524 B1* | 8/2002 | Yang et al. ............... | 323/282 |
| 7,561,394 B2 | 7/2009 | Mulligan et al. | |
| 2007/0200744 A1* | 8/2007 | Bonaccio et al. ......... | 341/145 |
| 2009/0224736 A1* | 9/2009 | Santo et al. .............. | 323/274 |
| 2012/0306557 A1* | 12/2012 | Lin .......................... | 327/283 |
| 2013/0169159 A1* | 7/2013 | Lys ......................... | 315/122 |
| 2013/0257491 A1* | 10/2013 | Won et al. ............... | 327/109 |

* cited by examiner

*Primary Examiner* — Minh D A
(74) *Attorney, Agent, or Firm* — Norton Rose Fulbright US LLP

(57) ABSTRACT

A variable resistance device may be used in a dimmer compatibility circuit to reduce power dissipation in an integrated circuit of the dimmer compatibility circuit. For example, the integrated circuit may include switches coupled to resistors external to the integrated circuit. The integrated circuit may operate the switches to commutate among the external resistors and select a voltage drop that reduces a voltage at a drain voltage of the switches. The reduced drain voltage reduces power dissipation in the switches and instead dissipates the power in the external resistors.

23 Claims, 15 Drawing Sheets

US 9,209,685 B2

VARIABLE RESISTANCE DEVICE FOR REDUCED POWER DISSIPATION IN DIMMER COMPATIBILITY CIRCUITS

FIELD OF THE DISCLOSURE

The instant disclosure relates to lighting circuits. More specifically, this disclosure relates to dimmer compatibility.

BACKGROUND

Electronic systems utilize dimmers to modify output power delivered to a load. For example, in a lighting system, dimmers provide an input signal to a lighting system, and the load includes one or more light sources such as one or more light emitting diodes (LEDs) or one or more fluorescent light sources. Dimmers may also be used to modify power delivered to other types of loads, such as one or more motors or one or more portable power sources. The input signal represents a dimming level that causes the lighting system to adjust power delivered to a lamp, and, thus, depending on the dimming level, increase or decrease the brightness of the lamp. Many different types of dimmers exist. In general, dimmers use a digital or analog coded dimming signal that indicates a desired dimming level.

Conventionally, dimmers are constructed with a triode for alternating current ("TRIAC") device to modulate a phase angle of each cycle of an alternating current ("AC") supply voltage. The TRIAC is placed in series with the power connection, acting as low impedance series device when in the "on" state, and as an open circuit when in the "off" state. That is, the TRIAC cuts the AC waveform during a certain time. If the cut occurs at the beginning of the cycle, the dimmer is called "leading edge" (LE). If the cut occurs at the end of the cycle, the dimmer is called a "trailing edge" (TE) dimmer.

FIG. 1 is a graph illustrating various waveforms of a conventional leading edge (LE) dimmer system. A $V_{line}$ voltage line illustrates a live voltage supplied to a circuit after passing through a dimmer and rectifier component. As described above, in a leading edge system the beginning of each cycle of the voltage is cut off. Additionally, FIG. 1 shows various currents within a device, including the dimmer current, $I_{dimmer}$.

When the load is drawing no current, the rectifier, together with capacitance present in the circuit, maintains a nearly constant voltage at the line output when the line voltage decreases. Digitally-controlled converters, however, require information about the line voltage zero crossing to synchronize their operation to the line frequency. The converter typically draws current only during a portion of the line cycle to feed the load, such as while the dimmer is on. The shape of the rectified line voltage may be recovered if an additional current, such as a "probe" current, is applied such that the internal capacitances are discharged and the rectifier output follows the input voltage. Also, when the dimmer is off, it is necessary to discharge the dimmer timing network to guarantee a repeatable firing angle. This is performed by presenting to the line voltage a low impedance path.

This additional current, and other currents, are drawn from an AC line voltage through a controlled device, such as a current mode digital-to-analog converter (DAC). The power dissipated in this device is proportional to the current and the voltage across it. For example, as shown on FIG. 1, a dimmer current peaks between time A and time B at the start of the leading edge (LE) of the line voltage, $V_{line}$. This current, $I_{dimmer}$, is conventionally dissipated as power within the controlled device. If the DAC is part of an integrated circuit, the power may be excessive unless the voltage is reduced to acceptable levels. One solution is to use an external discrete active device (FET) that provides a voltage drop, but the FET is a costly device and may consume a large amount of component space when built to handle the power ratings required to dissipate the currents.

Shortcomings mentioned here are only representative and are included simply to highlight that a need exists for improved integrated circuits, particularly for lighting devices. Embodiments described here address certain shortcomings but not necessarily each and every one described here or known in the art.

SUMMARY

In certain embodiments, a variable resistance device may be used to reduce power dissipation in active devices used as current sinks in dimmer compatibility circuits. For example, the variable resistance device may include two or more discrete resistors in a configurable load device. A variable resistance may be obtained by commutating among the discrete resistors with switches located in an integrated circuit (IC). The discrete resistors may be arranged in parallel or in series with corresponding switches to control the variable resistance. A controller may generate gate signals for each of the switches to switch the variable resistance device from one state to another state based on conditions in the circuit. In particular, the switches may be field effect transistors (FETs) and the variable resistance device may be controlled to maintain a low or minimum voltage at a drain of the FET such that the FET operates in a saturation region as a current sink. The use of discrete resistors may allow dissipation of power outside of the FET by the resistors of the configurable load device. In one embodiment, the FETs may then be integrated onto a controller chip to reduce the cost of the dimmer compatibility circuit.

According to one embodiment, an apparatus may include an input node, a variable resistance device coupled to the input node and comprising at least a first resistor and a second resistor, wherein the variable resistance device is configured to dissipate power from the input node, and an integrated circuit coupled to the variable resistance device. The integrated circuit may include a drain voltage node, a first switch coupled to the first resistor and coupled to the drain voltage node, and a second switch coupled to the second resistor and coupled to the drain voltage node. The integrated circuit may be configured to commutate among the first resistor and the second resistor with the first switch and the second switch, respectively, based, at least in part, on maintaining approximately a desired voltage at the drain voltage node.

The integrated circuit may also be configured to select at least one of the first resistor and the second resistor to maintain a minimum voltage at the drain voltage node to operate a selected one of the first switch and the second switch as a current source; configured to operate the first switch to enable the first resistor and to operate the second switch to enable the second resistor; configured to measure the first resistor and the second resistor; configured to select at least one of the first resistor and the second resistor to maintain approximately a desired voltage at the drain voltage node based, at least in part, on the measured resistance of the first resistor and the second resistor; configured to configure the variable resistance device for a first resistance having a value of the first resistor; configured to configure the variable resistance device for a second resistance having a value of a sum of the value of the first resistor and a value of the second resistor; configured to configure the variable resistance device for a first resistance having a value of the first resistor; configured to configure the variable resistance device for a second resistance having a value of the second resistor; configured to monitor at least one of a voltage at the drain voltage node and a reference current; and/or configured to select at least one of the first resistor and the second resistor to maintain a desired voltage at a drain voltage node for the current sink based, at least in part, on at least one of a voltage at drain voltage node and the reference current.

The apparatus may also include a field effect transistor (FET); a plurality of resistors; series-coupled resistors; parallel-coupled resistors; a dimmer coupled to an alternating current (AC) power source and configured to produce a dimmed voltage output; and/or a rectifier coupled to the dimmer and configured to produce a rectified output voltage based on the dimmed voltage output.

According to another embodiment, a method may include receiving an input voltage from a power source; decreasing the input voltage to an output voltage through a variable resistance device; and/or adjusting a resistance of the variable resistance device to maintain approximately a desired voltage at the output supply voltage by dissipating power through the variable resistance device by operating a plurality of switches within the variable resistance device to commutate among at least a first resistor and a second resistor.

The method may also include engaging a first resistor of the variable resistance device while a second resistor is engaged; waiting an overlap time period after engaging the first resistor; disengaging the second resistor after waiting the overlap time period; waiting a debounce period after disengaging the second resistor; measuring a resistance of the first resistor and the second resistor; selecting at least one of the first resistor and the second resistor of the variable resistor module based, at least in part, on the measured resistance of the first resistor and the second resistor; selecting the first resistor for the resistance of the variable resistance device based, at least in part, on at least one of an output voltage, an input voltage, and a reference current; predicting a drain voltage based on a current demand of the output voltage and the desired voltage; selecting at least one of the first resistor and the second resistor to maintain approximately the desired voltage; distributing power dissipation between a transistor integrated in a dimmer control integrated circuit (IC) and the variable resistance device external to the dimmer control IC to reduce power dissipation within the dimmer control IC; operating the variable resistance device as a low impedance load of fixed value when a dimmer coupled to the dimmer control IC is off; and/or operating the variable resistance device as a programmable current sink when the dimmer is on.

According to a further embodiment, an apparatus may include an input node configured to receive a dimmed AC voltage; an output node configured to provide an output voltage to at least one light emitting diode (LED); a variable resistance device coupled to the input node and to the output node; and/or an integrated circuit comprising a current sink and coupled to the variable resistance device.

The apparatus may include at least two resistors of different resistances in the variable resistance device, in which the resistors may be external to the controller.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

A variable resistance device that produces a voltage drop that changes with current and line voltage may maintain a voltage across a current sink that remains constant at a low enough value to replicate a current source. This may reduce or minimize power dissipation in the current sink to allow the current sink to be integrated in a controller. Instead, power dissipation may occur in a configurable load device, which may be external to the controller, and include the two or more resistors.

Figure 1:
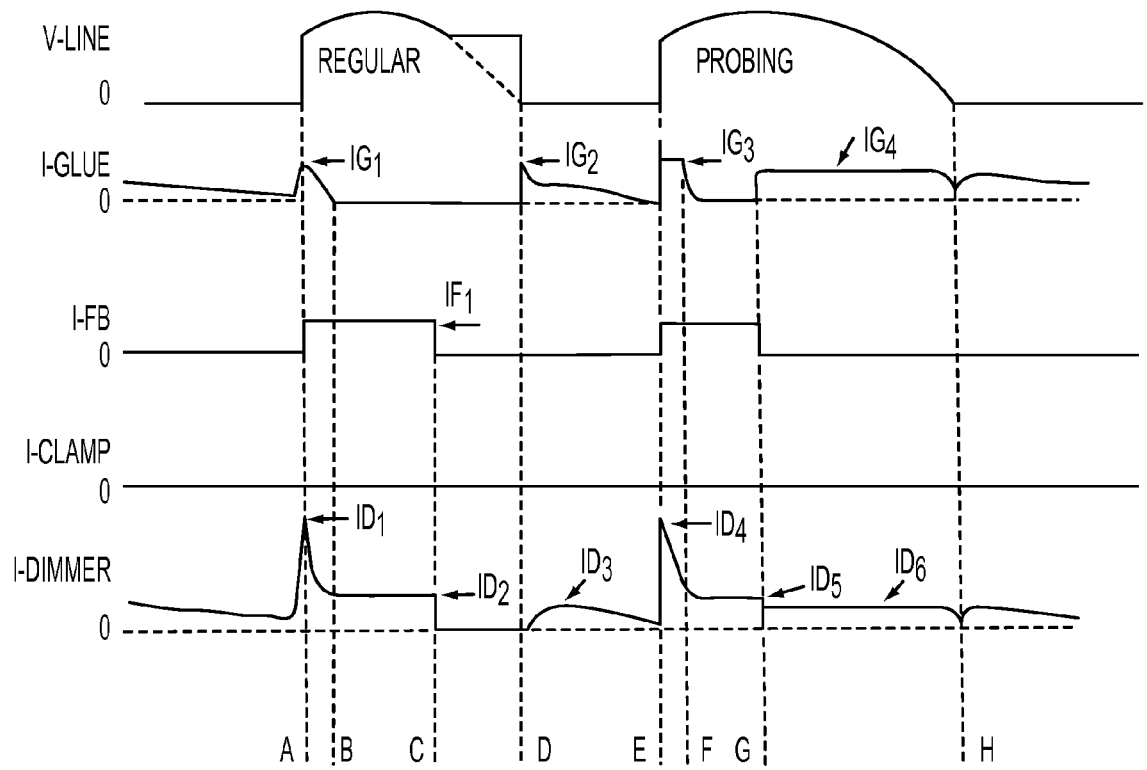
FIG. 1 is a graph illustrating various waveforms of a conventional leading edge (LE) dimmer system.
Figure 2:
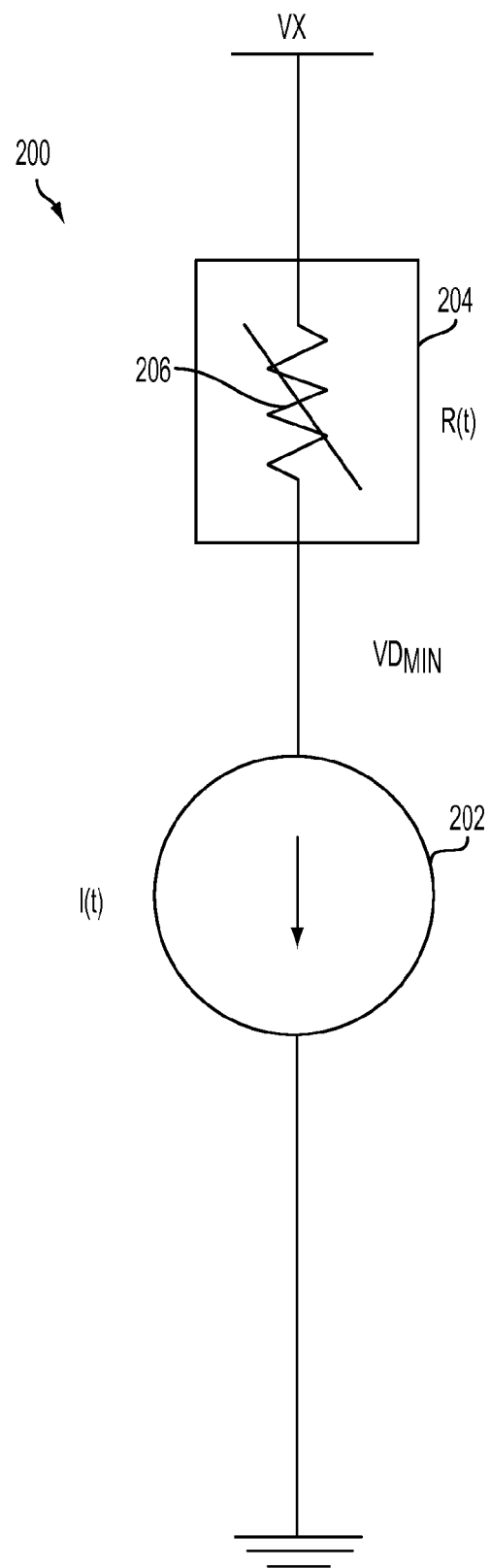
FIG. 2 is a block diagram illustrating a variable load device according to one embodiment of the disclosure.

FIG. 2 is a block diagram illustrating a variable resistance device according to one embodiment of the disclosure. A device 200 may include a current sink 202, a variable resistance 204, and a voltage source 206, $V_x$. The relationship between the current sink 202, the resistance 204, and the source 206 may be given by $V_{d,min}=V_x(t)-R*i(t)$, where $V_x(t)$ is a time-varying line voltage for the voltage source 206, i(t) is a time-varying current for the current sink 202, and $V_{d,min}$ is a desired voltage across the current sink 202. Thus, a desired resistance for the variable resistance 204 may be given by t,?
where R(t) is a value for the variable resistance 204 to obtain a desired $V_{d,min}$ across the current sink 202. In one embodiment, the current sink 202 may be implemented with N-type MOSFETs, such that the voltage across the current sink 202 is the voltage at the drain of the MOSFET.

The time-varying resistance 204 of FIG. 2 may be implemented using a discrete set of constant resistors that are switched on and off in time. The values of the set of resistors may be chosen such that an average power dissipated in the current sink 202 is reduced or minimized. This may allow integration of active devices, such as MOSFETs, into a controller integrated circuit (IC), while using inexpensive external devices, such as resistors, for power dissipation. For example, the resistors may be located in a configurable load device coupled to the IC. This may reduce the cost of a manufacturing the circuits. Although certain discrete sets of resistors may be described below, any number of discrete resistors may be used in the variable resistance 204. As a number of discrete resistors in the variable resistance 204 increases, the accuracy of replicating a continuously-variable resistance improves. The resistor of the discrete resistors that provides the lowest drain voltage larger than or equal to the desired drain voltage $V_{d,min}$ may be switched in, such that at all times the largest feasible load resistor is used.

The system 200 of FIG. 2 may be employed in lighting circuits for dimmer compatibility. For example, the system 200 may be considered a combination of a low impedance load, such as variable resistance 204, and a digitally controlled current sink, such as current sink 202. Control signals for operating the variable resistance 204 and the current sink 202 may be synchronized to operation of a dimmer. When the dimmer is off, the system 200 may behave as a low-impedance load with a fixed value. When the dimmer is on, the system 200 may behave as a programmable current sink.

Figure 3:
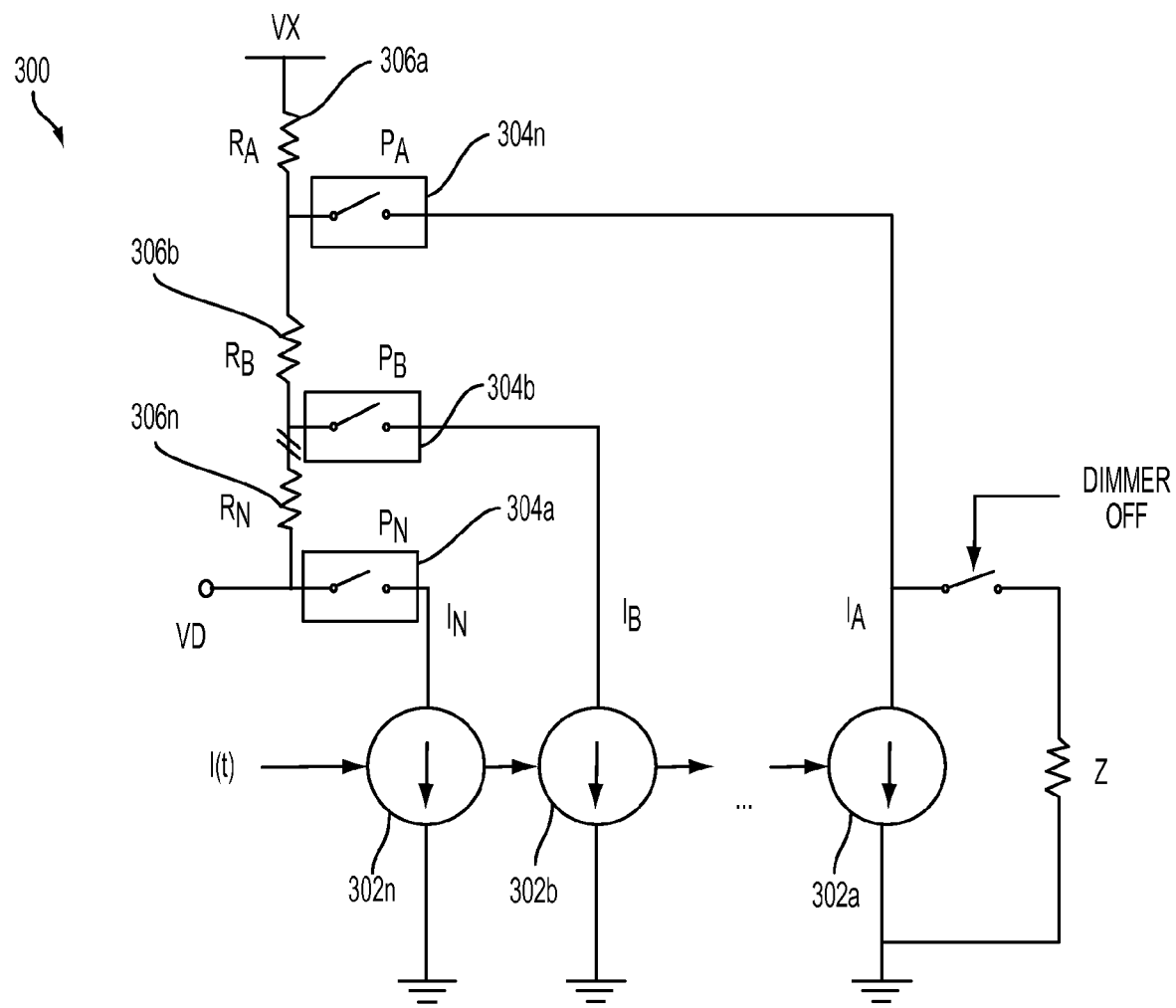
FIG. 3 is a block diagram illustrating an array of current sources for producing a time variable resistance according to one embodiment of the disclosure.

The system 200 may be implemented as a configuration of one or more resistors and one or more current sources arranged as shown in FIG. 3. FIG. 3 is a block diagram illustrating an array of current sources for producing a time variable resistance according to one embodiment of the disclosure. Current sources 302a, 302b, . . . , 302n produce a current $i(t)=I_a+I_b+\ldots+I_N$, where $I_a$ is the current through source 302a, and likewise for $I_b$ through $I_n$. In one embodiment, a single current source 302a, 302b, . . . , 302n may be active at any time. In some embodiments, multiple current sources 302a, 302b, . . . , 302n may be active, such as during a switch from one source to another source. Overlapping current sources during switching may ensure that the total current is still equal to a desired value. For example, a feedback loop, described below, may control switching and overlap between current sources.

The variable resistance of the system 300 may be adjusted through control signals to switch on or off switches 304a, 304b, . . . , 304n corresponding to resistances 306a, 306b, . . . , 306n. Examples of the variable resistances possible for the system 300 are shown in TABLE 1, where the $R_h$ are values of total resistance from a line to a drain of the active source k. The switch control signals P1, P2, . . . , PN may be determined based on, for example, current, line voltage, and resistor values.

TABLE 1

| Control Signals | Active source | Total load resistance |
|---|---|---|
| P1 = 1<br>Pk = 0 for k != 1 | $I_1$ on, dimmer off | $R_1 + Z$ |
| P1 = 1<br>Pk = 0 for k != 1 | $I_1$ on, dimmer on | $R_{h1} = R_1$ |
| P2 = 1<br>Pk = 0 for k != 2 | $I_2$ on | $R_{h2} = R_1 + R_2$ |
| PN = 1<br>Pk = 0 for k != N | $I_N$ on | $R_{hN} = R_1 + R_2 + \ldots + R_N$ |

Figure 4:
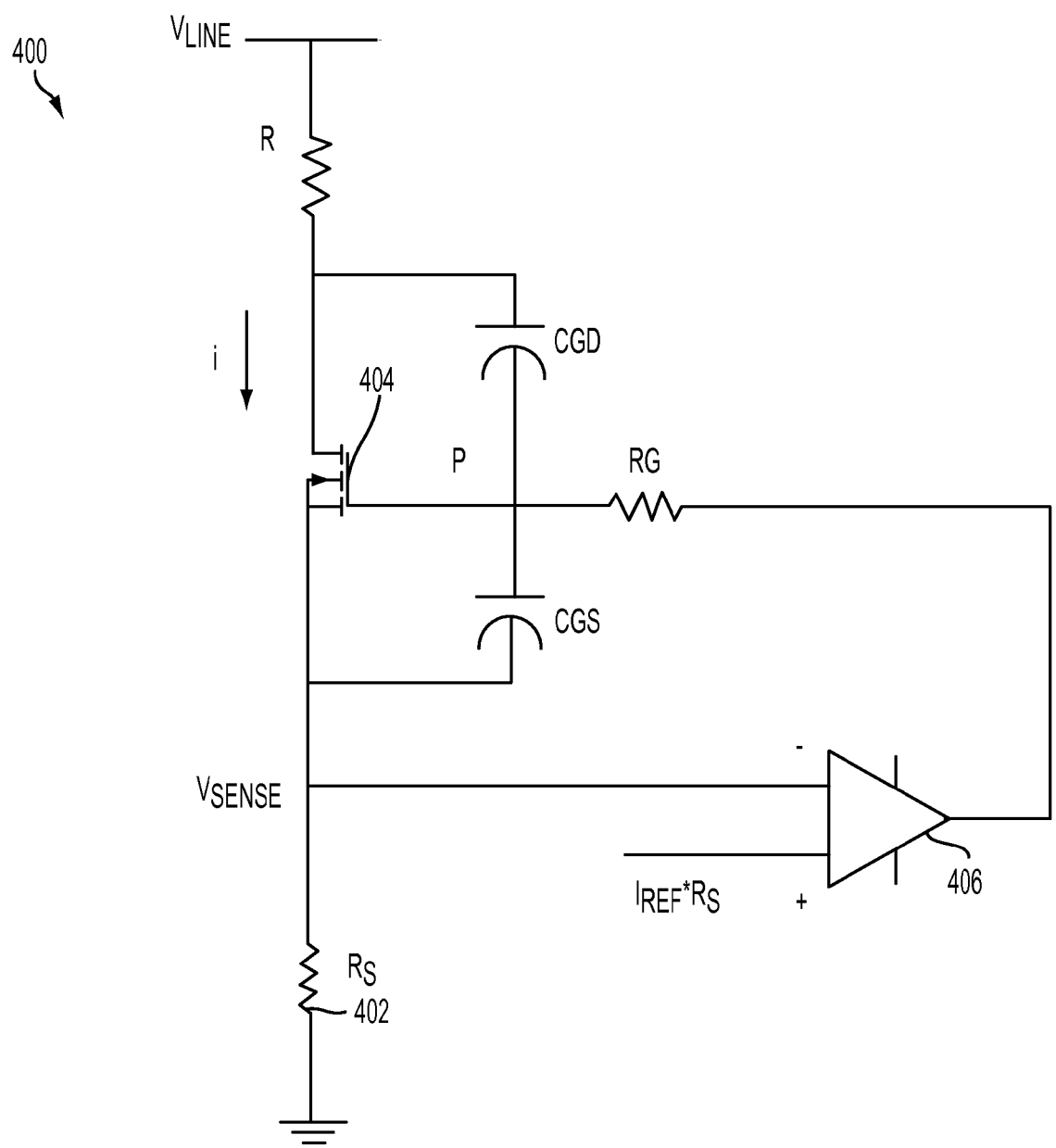
FIG. 4 is a circuit illustrating a current source with control feedback according to one embodiment of the disclosure.

The implementation of one of the sources is shown in FIG. 4. FIG. 4 is a circuit illustrating a current source with control feedback according to one embodiment of the disclosure. A current, i, sunk by a device 400 flows through a sense resistor 402 having resistance $R_s$. A voltage drop across the sense resistor 402 may be equal to $R_s*I$. This voltage drop may be compared at a comparator 406 with a reference value $I_{ref}*R_s$, where $I_{ref}=i(t)$, a desired current through a transistor 404. The reference value may be an analog quantity generated with a voltage-mode digital-to-analog converter (DAC) from a digital representation of the desired current. The comparator 406 output may be zero if $i>i_{ref}$ and a supply voltage, $V_{dd}$, otherwise. If the comparator 406 output is initially high, a gate capacitance of the transistor 404 will charge, resulting in an increasing current, i. When the reference value is reached, the comparator 406 will turn off, decreasing the gate voltage at the transistor 404. Then, the gate voltage will oscillate around a steady state value required to produce the desired current.

In one embodiment, the transistor 404 may be a field effect transistor (FET). The FET may be operated in a linear region by holding the gate voltage at a sufficiently high value. This may be achieved by defining a reference current higher than the actual current the transistor 404 can sink, which holds the comparator 406 output high. The current sunk may be limited by the line voltage being low, but when the line voltage increases enough to sustain the desired current, the comparator 406 will output a low signal and the gate voltage of the transistor 404 will descend to a steady-state level. Thus, the device 400 may perform the functions of the current source 302 and the resistive element 306 shown in FIG. 3. This operation may be used during a dimmer off-to-dimmer on transition.

Figure 5A:
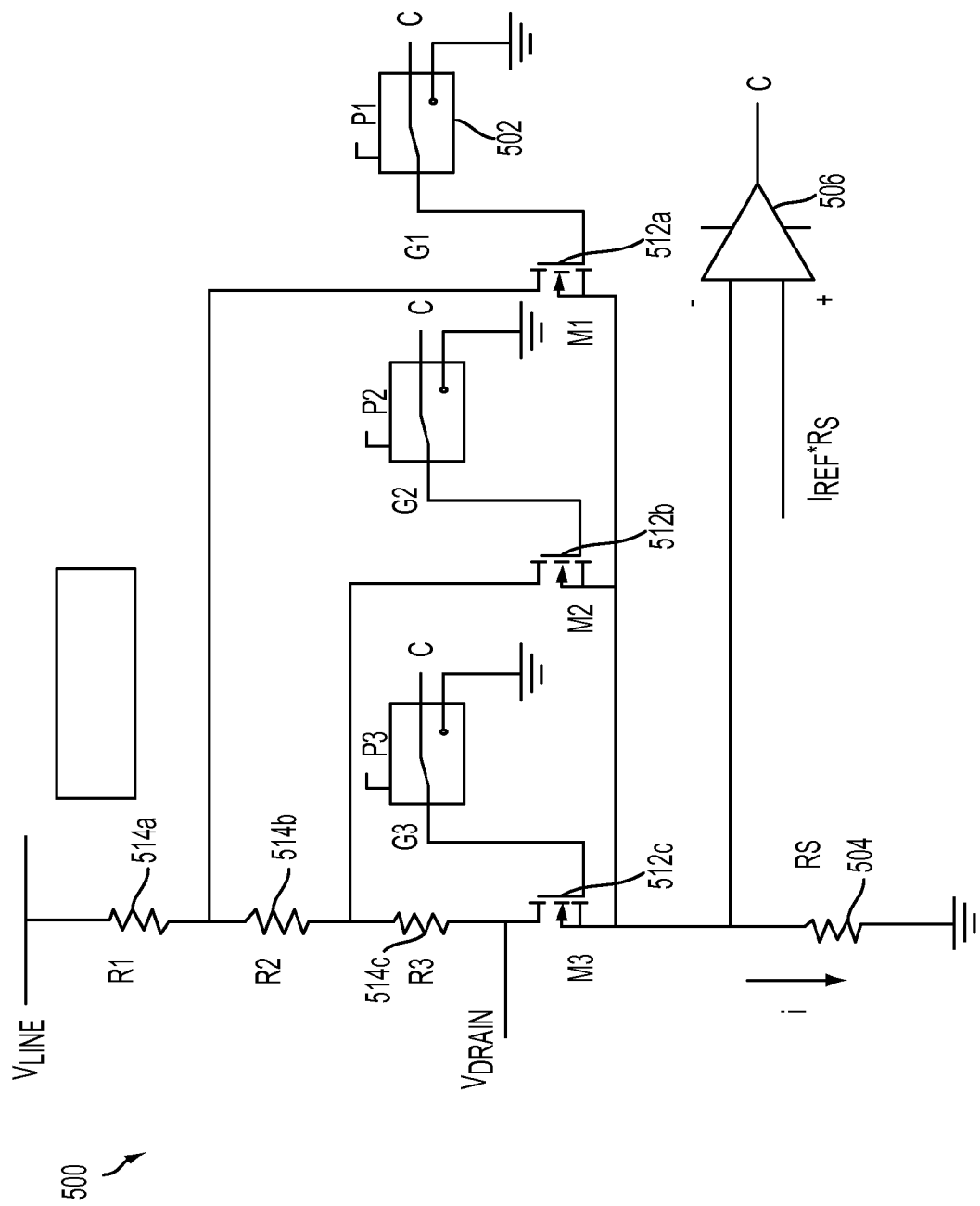
FIG. 5A is a circuit illustrating a variable resistance current sink with three current sources according to one embodiment of the disclosure.

In one specific implementation of a variable resistance device of FIG. 3 with the current sink configuration of FIG. 4, there may be 3 sources as illustrated in FIG. 5A. FIG. 5A is a circuit 500 illustrating a variable resistance current sink with three current sources according to one embodiment of the disclosure. A control signal P1 may control a switch 502 to select between an output C of comparator 506 and ground to produce a gate signal G1 for a transistor 512a. A similar switch may be coupled to transistors 512b and 512c to couple an output of the comparator 506 to the gate of the transistors 512b and 512c. A single control signal P1 may control switches for each of the transistors 512a, 512b, and 512c, or separate control signals P1, P2, and P3 may be used. The comparator 506 may compare a current, i, with a reference value as described above with reference to FIG. 4.

The variable resistance of the circuit 500 may be controlled through control signals G1, G2, and G3, to produce a resistance of either R1, R1+R2, or R1+R2+R3 to control a voltage at the $V_{drain}$ node. For example, if P1=1, P2=0, P3=0, and G1=C and the loop is closed through R1 and M1, then the drain voltage of transistor 512a may be available at $V_{drain}$, because there is no voltage drop across R2 and R3. Similarly, if P1=0, P2=1, P3=0, and G2=C and the loop is closed through R1+R2 and the transistor 512b, then the drain voltage of M2 may be available at because there is no drop across R3. The voltage at $V_{drain}$ may be the drain voltage of the currently active device.

Control signals G1, G2, and G3 may be generated from a switching algorithm to determine when the circuit 500 should change resistance. In one embodiment, the control signals G1, G2, and G3 may be adjusted to keep a selected device, such as either the transistor 512a, 512b, and 512c, in a saturation region so that the transistor acts as a current source by maintaining a desired $V_{drain}$. However, in some embodiments, the transistor 512a, M1, may also be selected during a time that a dimmer is off and is intentionally made to operate in the linear region, as described above.

The gate voltage of an activated transistor of the transistors 512a, 512b, and 512c may oscillate around a steady-state value, and that oscillation may have a certain amplitude and frequency. This oscillation may create a ripple in the current through the active transistor, which may produce a ripple in the drain voltage, $V_{drain}$. The transistor may be held in the saturation region, even in the presence of the ripple, $\Delta V_d$, by satisfying $$V_{line} - I_{ref} R_h > \Delta V_d + \Delta V_{gs} = V_{th},$$

where $V_{line}$ is an AC line voltage, $I_{ref}$ is a reference current for the comparator 506, $R_h$ is the selected resistance for the circuit 400, and $\Delta V_d$ is the ripple. The threshold voltage, $V_{th}$, may depend on load resistance, device characteristics, loop parameters, and other factors. Thus, the threshold voltage may be defined as a programmable quantity in a controller (not shown) generating the control signals P, G1, G2, G3, and the like.

Generation of the control signals may also take into consideration other parameters including a debounce time, during which switching events are inhibited to avoid chattering when there is noise on the line voltage, hysteresis, and/or overlap between control signals. Overlap between activation of the transistors 512a, 512b, and 512c may be implemented by a controller to allow charging the gate capacitance to a sufficient value to produce the desired current while a previous source continues conducting.

Figure 5B:
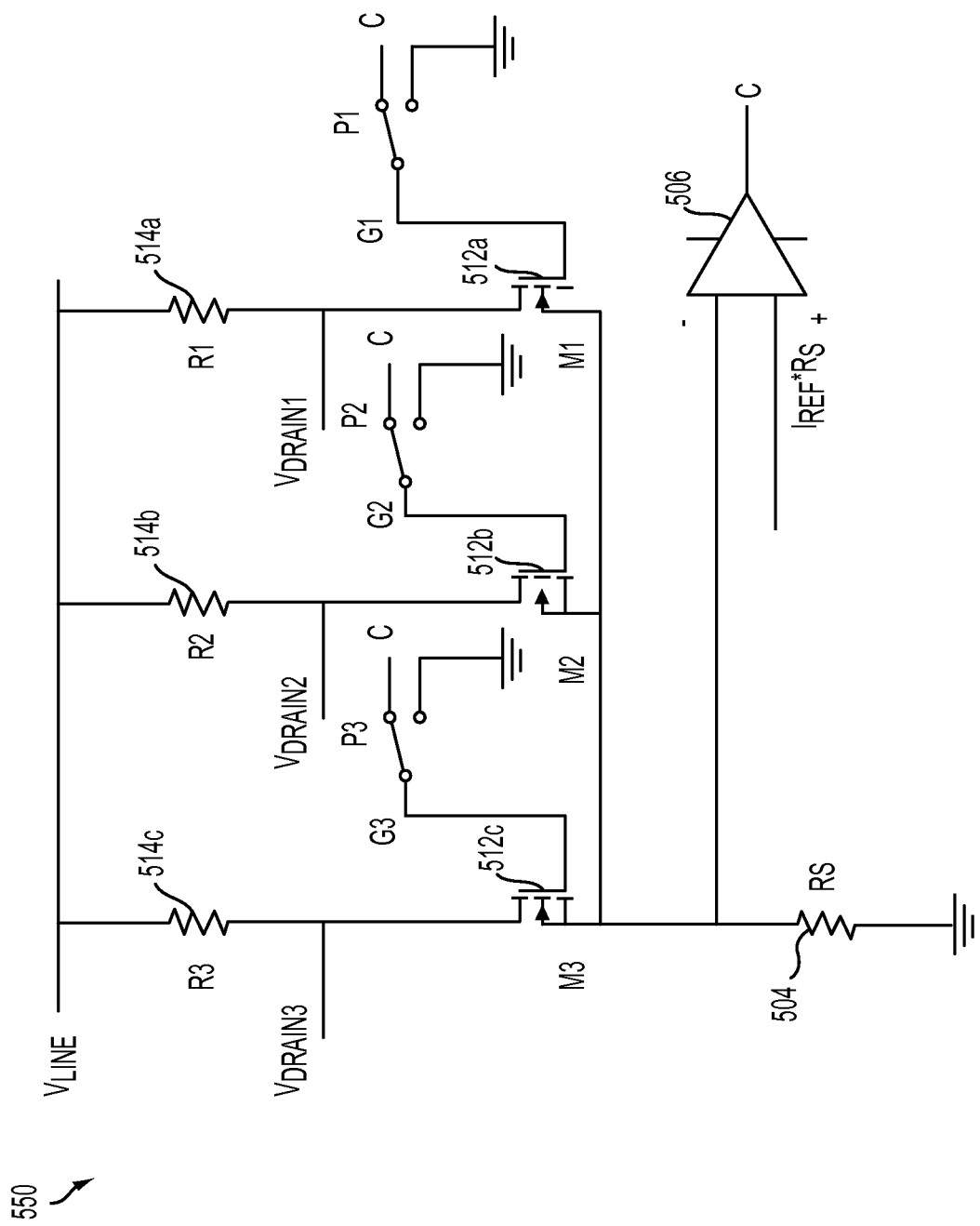
FIG. 5B is a circuit illustrating a variable resistance current sink with three current sources according to another embodiment of the disclosure.

The configuration of the circuit 500 of FIG. 5A illustrates an embodiment of a dimmer compatibility circuit with series coupled discrete resistors. The discrete resistors may also be coupled in other configurations, such as a parallel configuration illustrated in FIG. 5B. FIG. 5B is a circuit 550 illustrating a variable resistance current sink with three current sources according to another embodiment of the disclosure. The circuit 550 is similar to that of the circuit 500 of FIG. 5A. However, the resistors 514a, 514b, and 514c are coupled in parallel between the line voltage, $V_{line}$, and the drain voltages, $V_{drain1}$, $V_{drain2}$, and $V_{drain3}$.

Figure 6:
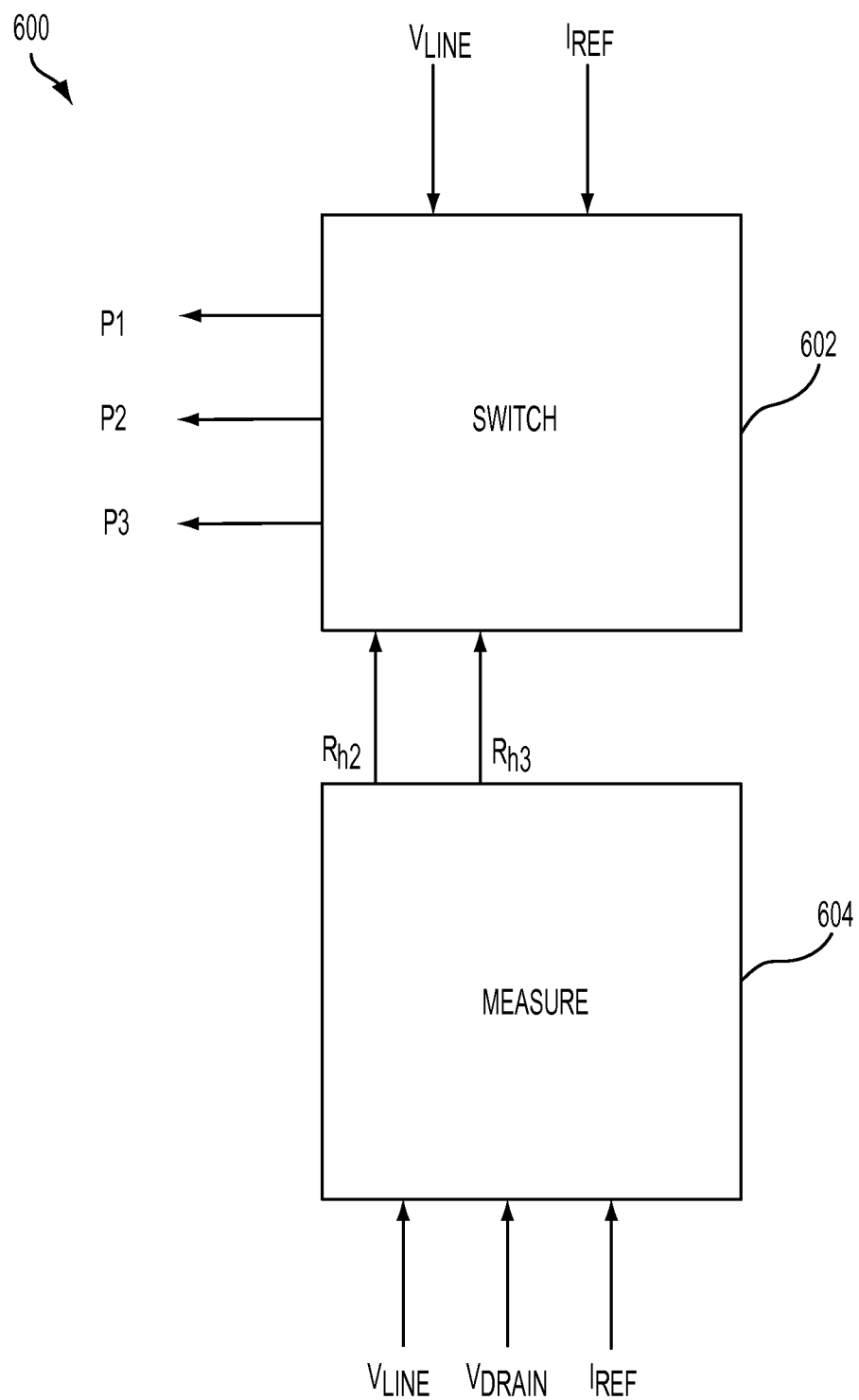
FIG. 6 is a block diagram illustrating a circuit for controlling a variable resistance device in a dimmer compatibility circuit according to one embodiment of the disclosure.

The various control signals, such as P1, P2, P3, G1, G2, and G3, may be generated from a controller integrated circuit (IC). FIG. 6 is a block diagram illustrating a circuit for controlling a variable resistance device in a dimmer compatibility circuit according to one embodiment of the disclosure. The controller 600 may include a first block 602 of switches for switching a signal to enable or disable switches coupled to the P1, P2, and P3 signals. The first block 602 may receive as input the line voltage, $V_{line}$, the reference current, $I_{ref}$, and resistance measurements, such as $R_{h2}$ and $R_{h3}$. The controller 600 may also include a second block 604 of circuits for measuring the resistances available in the variable resistance device through inputs of the line voltage, $V_{line}$, the drain voltage, $V_{drain}$, and the reference current, $I_{ref}$. The controller 600 may execute algorithms, such as those disclosed below with reference to FIGS. 7, 8, 9, and 10 to control a variable resistance device, such as those illustrated in FIGS. 2, 3, 4, 5A, and 5B.

Figure 7:
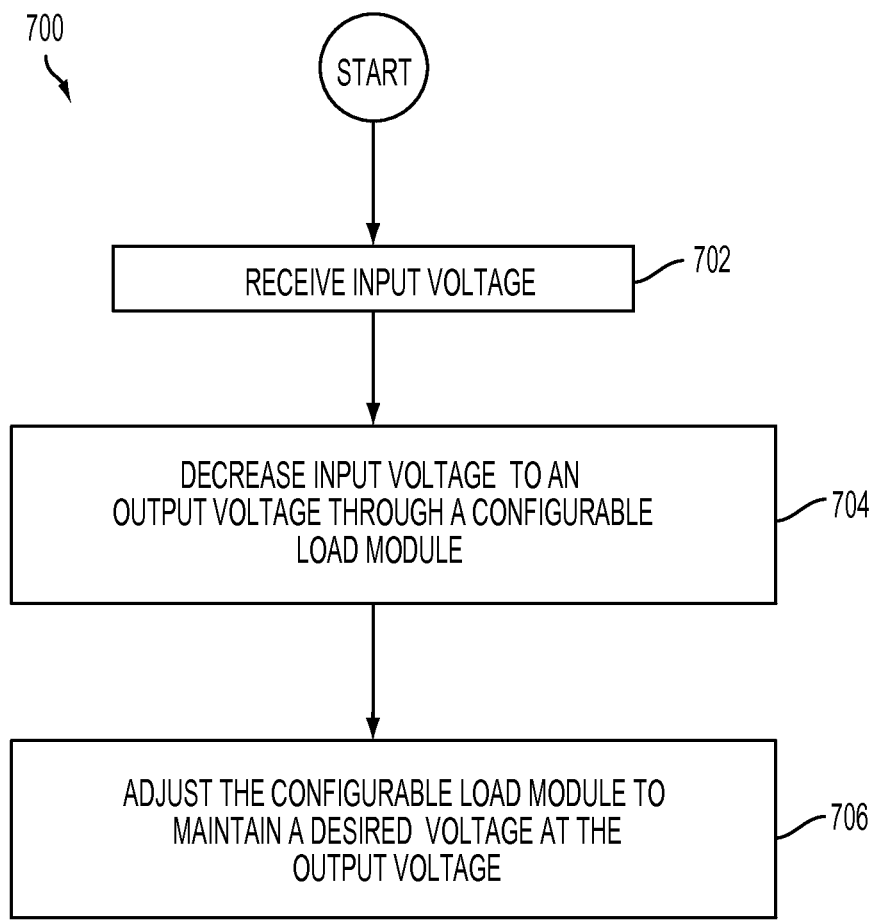
FIG. 7 is a flow chart illustrating a method of providing an output voltage through a variable resistance device according to one embodiment of the disclosure.

FIG. 7 is a flow chart illustrating a method of providing an output voltage through a variable resistance device according to one embodiment of the disclosure. A method 700 starts at block 702 with receiving an input voltage and at block 704 decreasing the input voltage to an output voltage through a variable resistance device. At block 706, the variable resistance device may be adjusted to maintain a desired voltage at the output voltage. The desired output voltage may be produced at the drain node, $V_{drain}$, to sink current through the variable resistance device.

Figure 8A:
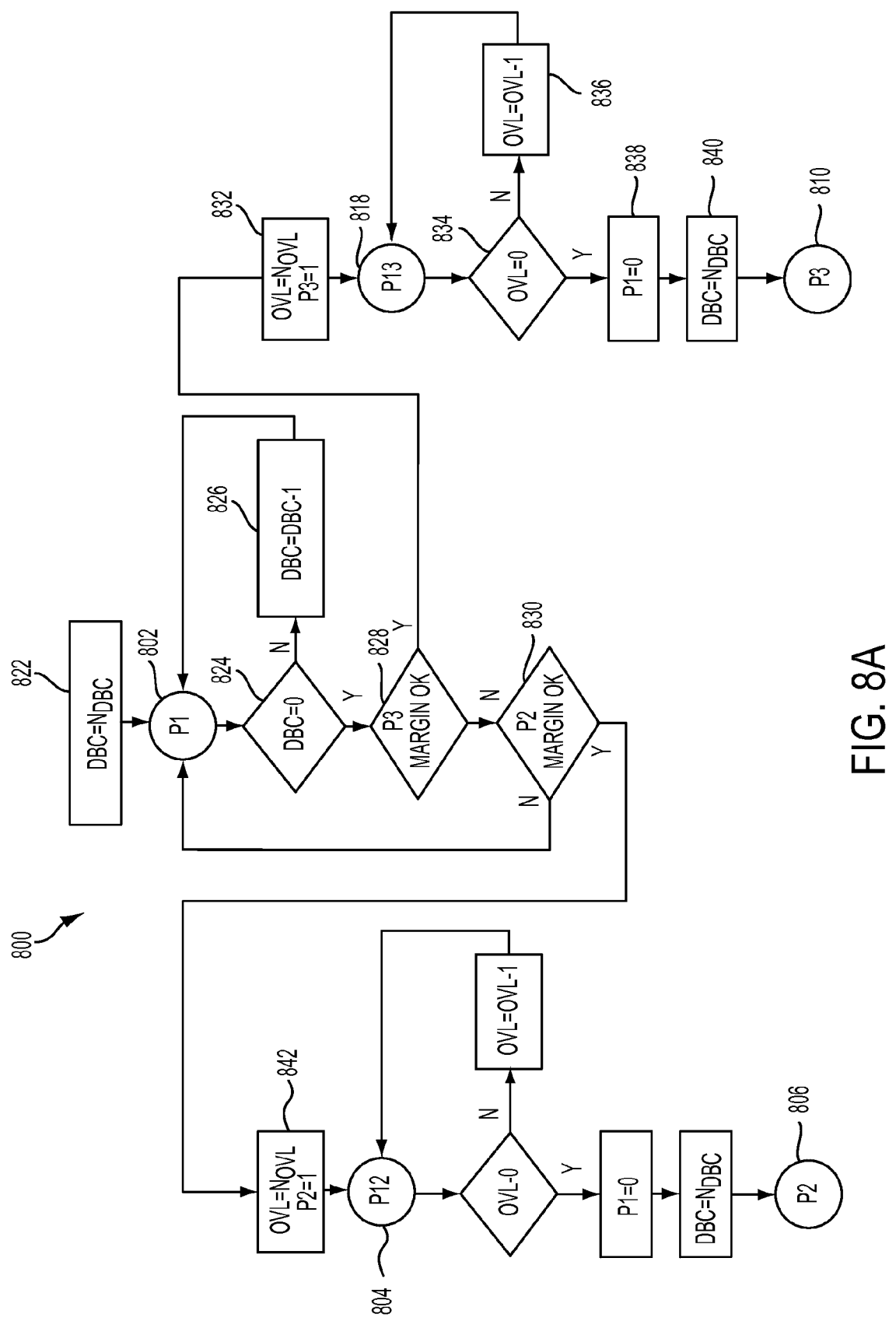
FIGS. 8A-C are a flow chart illustrating a method for transitioning between resistances in a variable resistance device with debounce and overlap according to one embodiment of the disclosure.
Figure 8B:
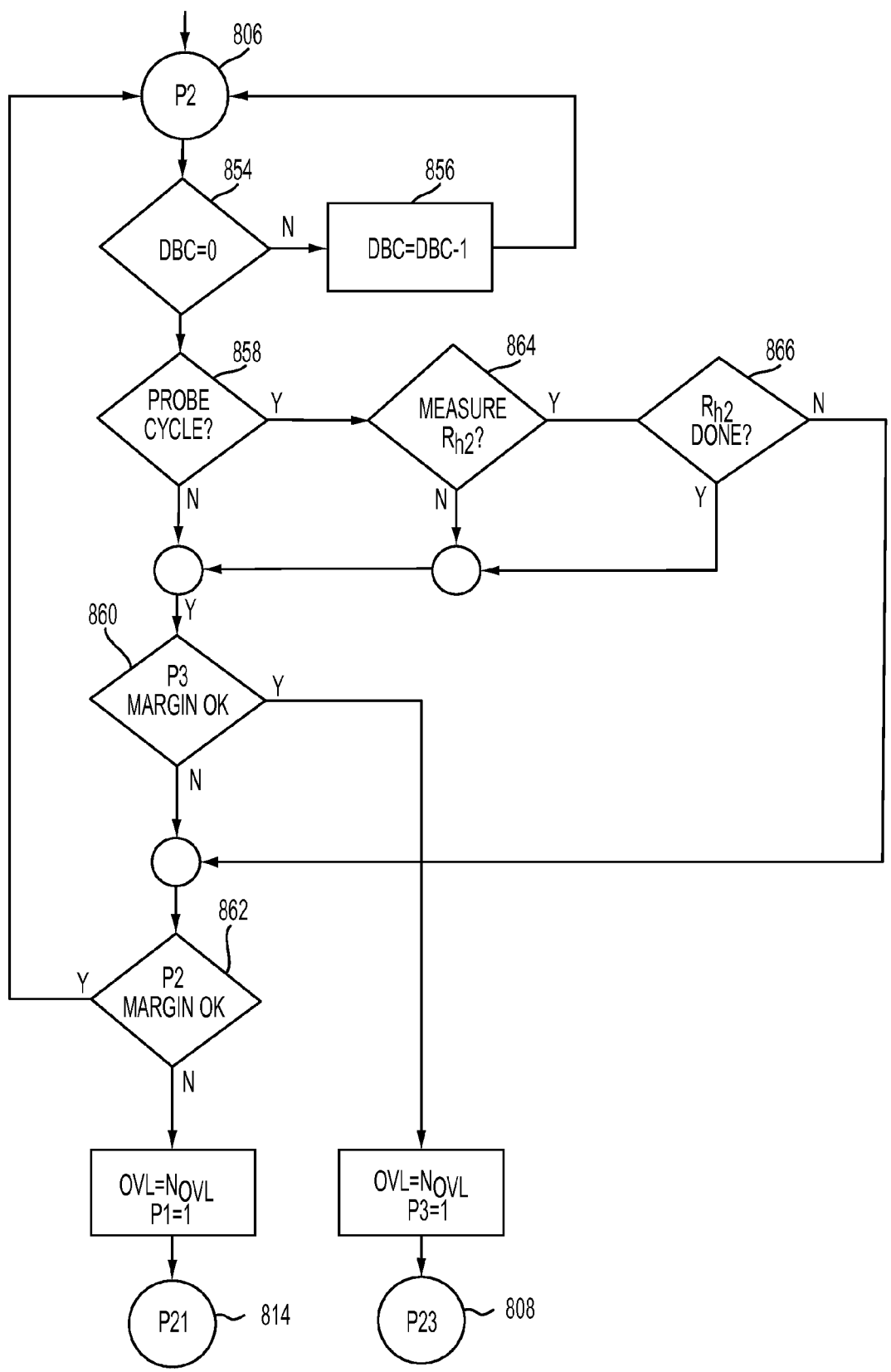
Figure 8C:
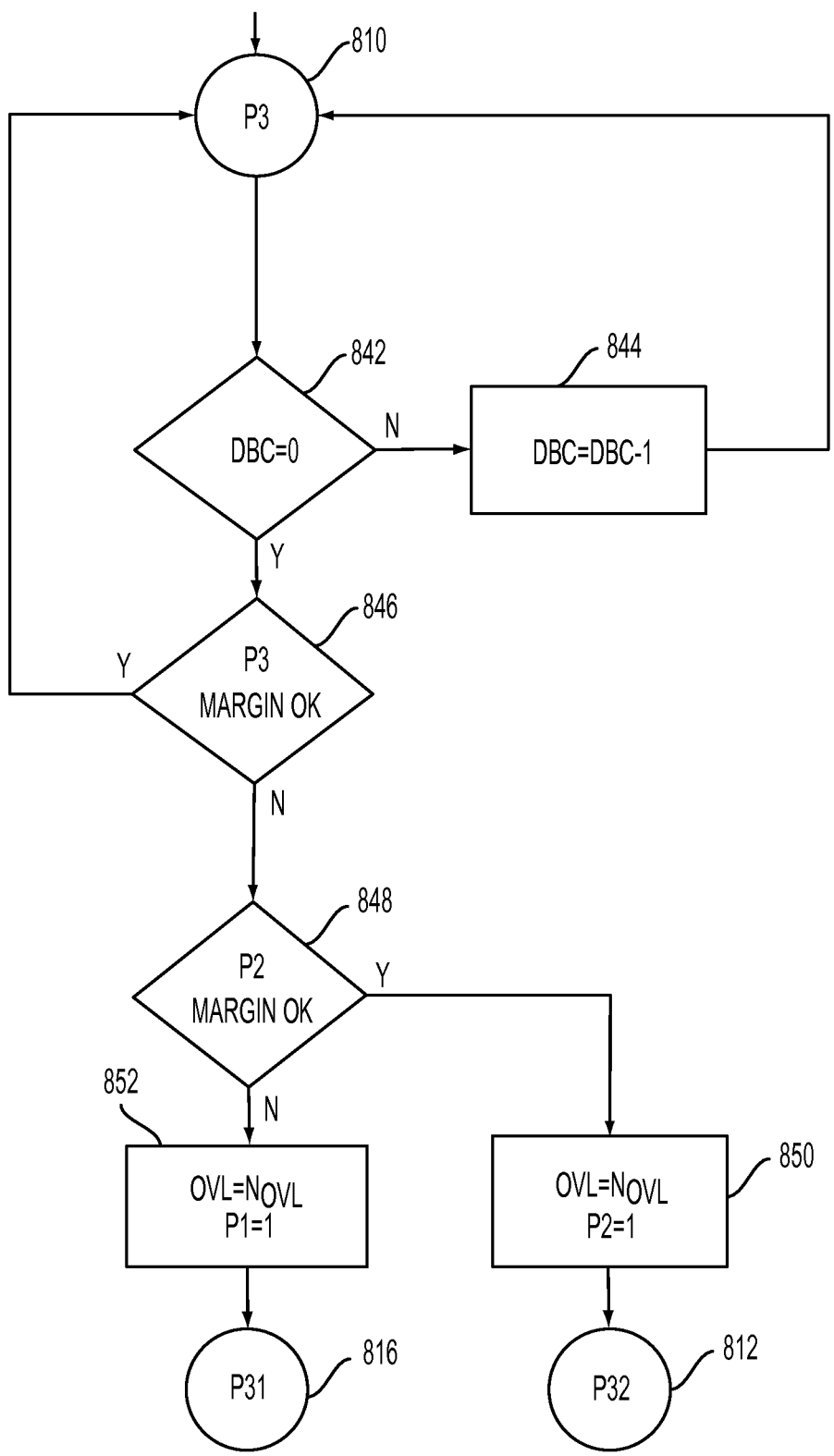

FIGS. 8A-C are a flow chart illustrating a method for transitioning between resistances in a variable resistance device with debounce and overlap according to one embodiment of the disclosure. Several possible states for the device are shown, including a state 802, P1, having transistor 512a conducting, a state 804, P12, for transitioning from P1 to P2, a state 806, P2, having transistor 512b conducting, a state 808, P23, for transition from P2 to P3, a state 810, P3, having transistor 512c conducting, a state 812, P32, for transitioning from P3 to P2, a state 814, P21, for transitioning from P2 to P1, a state 816, P31, for transitioning from P3 to P1, and a state 818 for transitioning from P1 to P3. The method 800 may employ a debounce counter, DBC, and an overlap counter, OVL, to assist in transition between configurations of resistances.

For example, the method 800 may start at block 822 with setting the DBC counter to a default debounce value, $N_{dbc}$. The device may then enter the P1 state at block 802. After entering the P1 state, it is determined at block 824 whether the debounce counter is equal to zero. If not, then the method 800 proceeds to block 826 to decrement the debounce counter and the method 800 returns to block 802 and block 824 to check the debounce counter, DBC. When the debounce counter, DBC, has been decremented to zero, the method 800 proceeds to block 828. The debounce counter, DBC, serves to limit the rate of changes from one configuration to another configuration of the variable resistance device. That is, after the state 802 is entered, there is a delay period before another state, such as the states 804 and 818 may be entered. The delay period may be proportional to the default debounce value, $N_{dbc}$.

After the debounce delay period has passed by proceeding through blocks 824, 826, and 802, it is determined at block 828 whether a margin for entering the state 810, P3, is acceptable. In one embodiment, the margin may be acceptable if one of the following equations is satisfied for the resistance, $R_h$, corresponding to the state being tested:

$$V_{line} - I_{ref} R_h > \Delta V_d + \Delta V_{gs} = V_{th};$$

$V_{line} - I_{ref} R_h > V_{th} + h$, for state 804 or state 808, where $h$ is a hysteresis value; or $V_{line} - I_{ref} R_h > V_{th} - h$, for state 812 or state 814.

The determination of margins at block 828 are performed to identify a larger or the largest resistance that provides sufficient margin of operation to allow the current sink to remain in saturation mode.

The value of resistance, $R_h$, may be preprogrammed into a controller for generating the control signals for transitioning between modes. In one embodiment, because the resistance may be subject to tolerances and changes due to heating, the highest possible value for the resistance $R_h$ under all circumstances may be preprogrammed to ensure that the drain voltage will have a sufficient value. Alternatively, the resistance, $R_h$, may be measured during operation of the device.

If the margin is determined to be sufficient at block 828, the method 800 may begin to transition the device to state 810, P3, at block 832. If the margin is not sufficient for transitioning to state 810, P3, then the method 800 may proceed to block 830 to determine if a margin for state 806, P2, is sufficient. If the margin for operation in state 806, P2, is sufficient, then the controller may begin to transition the device to state 806, P2, at block 842. If the margin is not sufficient for transitioning to state 806, P2, then the method 800 may remain at state 802, P1, and continue to reevaluate margins at blocks 828 and 830.

When the margin is sufficient for transitioning to state 810, P3, the method 800 proceeds to block 832. At block 832, an overlap counter, $N_{ovl}$, is set to a default overlap value, and the control signal P3 is activated to enable the transistor 512c. The method 800 proceeds to state 818, P13, for transitioning to the state 810, P3. In the transition state 818, P13, both the transistor 512a and the transistor 512c may be conducting for a defined overlap period to allow charging of the gate capacitance of the transistor 512c before disabling the transistor 512a. The overlap delay period may be implemented through blocks 834 and blocks 836. At block 834, it is determined if the overlap counter, OVL, is equal to zero. If not, the overlap counter, OVL, is decremented and the method 800 repeats through blocks 818 and 834. When the overlap counter, OVL, reaches zero at block 834, the method 800 continues to block 838 to set control signal P1 to 0 to disable the transistor 512a, and then to block 840 to set the debounce counter, DBC, to a default debounce value, $N_{dbc}$. A similar process to that described for the transition to state 810, P3, may be used for transitioning to the state 806, P2.

Figure 9:
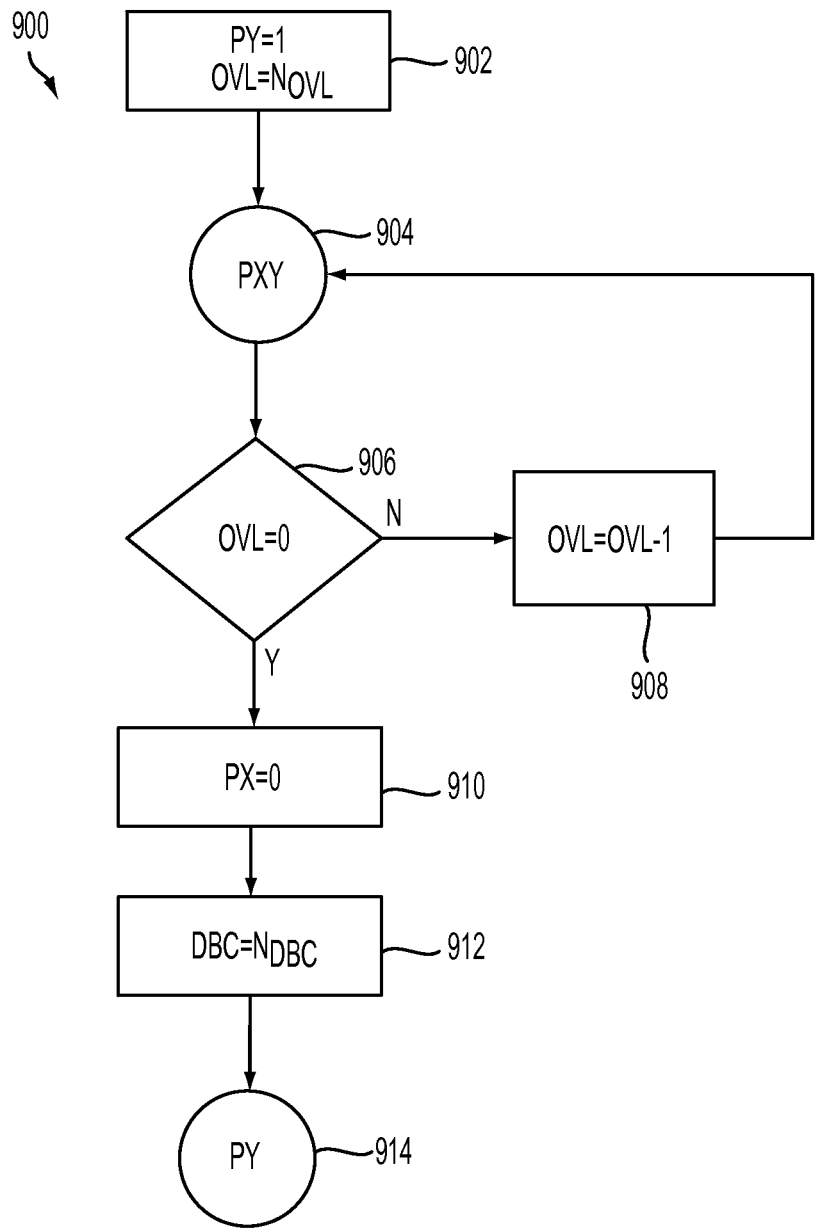
FIG. 9 is a flow chart illustrating a method for transition between different resistance states of a variable resistance device according to one embodiment of the disclosure.

A generalized transition process is illustrated in FIG. 9. FIG. 9 is a flow chart illustrating a method for transition between different resistance states of a variable resistance device according to one embodiment of the disclosure. A method 900 begins at block 902 with setting control signal $P_Y=1$, where Y corresponds to the transistor for the next resistance state of the variable resistance device, and an overlap counter, OVL, is set to a default overlap value. After block 902, the method 900 enters state 904, $P_{XY}$, where X corresponds to the transistor for the current resistance state of the variable resistance device. At block 906, it is determined whether the overlap counter, OVL, has reached zero. If not, the overlap counter, OVL, is decremented at block 908 and the method 900 returns to block 906. If yes, then the method 900 proceeds to block 910 to set control signal $P_X=0$, to stop conduction through the transistor corresponding to the current resistance state. At block 912, a debounce counter, DBC, is set to a default debounce value, $N_{dbc}$. After block 912, the variable resistance device is in state 914, $P_Y$.

Referring back to FIGS. 8A-C, after state 810, P3, is entered, a debounce delay period is entered at blocks 842 and 844, after which the controller determines at block 846 whether sufficient margin exists for remaining at state 810, P3. If yes, then the controller continues looping through blocks 810 and 846. If the margin is not sufficient, then it is determined at block 848 whether sufficient margin exists for entering state 806, P2. If yes, then the method 800 proceeds to block 850 to transition to state 812, P32. At block 850, the controller sets control signal P2=1 to enable the transistor 512b and sets an overlap timer, OVL, to a default overlap value, $N_{ovl}$. If the margin is not sufficient at block 848, then the method 800 proceeds to block 852 to transition to state 816, P31. At block 852, the controller sets control signal P1=1 to enable the transistor 512a and sets an overlap timer, OVL, to a default overlap value, $N_{ovl}$. The state 816, P31, and the state 812, P32, may begin transition processes similar to that described with reference to FIG. 9.

According to one embodiment, resistance measurements may be performed in certain states before determining whether to transition to another state. For example, the method 800 for operation in the state 806, P2, may include a resistance measurement. A resistance measurement may be timed for a state during which current has flowed for an extended period of time, such as during probe cycles of a dimmer. Probe cycles are cycles during which approximately a constant current flow may be maintained through the dimmer to expose the line voltage, $V_{line}$, and determine a line voltage zero crossing for synchronizing internal timing circuitry. Probe cycles may occur approximately every N=25 half line cycles, or generally, as infrequently as possible to conserve power.

Referring to FIG. 8B, after the state 806, P2, is entered, a debounce delay period is implemented in blocks 854 and 856. At block 858, it is determined whether a probe cycle is occurring. If not, then it is determined at block 860 whether a sufficient margin exists for state 810, P3. If so, then operation is switched to the state 810, P3, by transitioning to state 808, P23. If there is insufficient margin for state 810, P3, at block 860, then it is determined at block 862 whether there is sufficient margin for operation in state 806, P2. If so, then the method 800 returns to block 806. If not, then the method 800 proceeds to transition to state 808, P23.

If it is determined that a probe cycle is occurring at block 858, then it is determined at block 864 whether to measure the resistance of $R_{h2}$, the resistance corresponding to the state 806, P2. If not, the method 800 continues to block 860. If measurement is to be measured, then the controller remains in the state 806, P2, as long as possible, checking only if the margin for state 806, P2, at block 862 is sufficient. For example, the measurement of $R_{h2}$ may be initiated, and it is determined at block 866 if the measurement is complete. If not, then the method 800 proceeds to block 862, block 858, and back to block 866. If the measurement of Rh2 completes during current probe cycle, normal operation is resumed by proceeding from block 866 to block 860. If the measurement does not complete during the probe cycle, then the measurement may be resumed in the next probe cycle.

Figure 10:
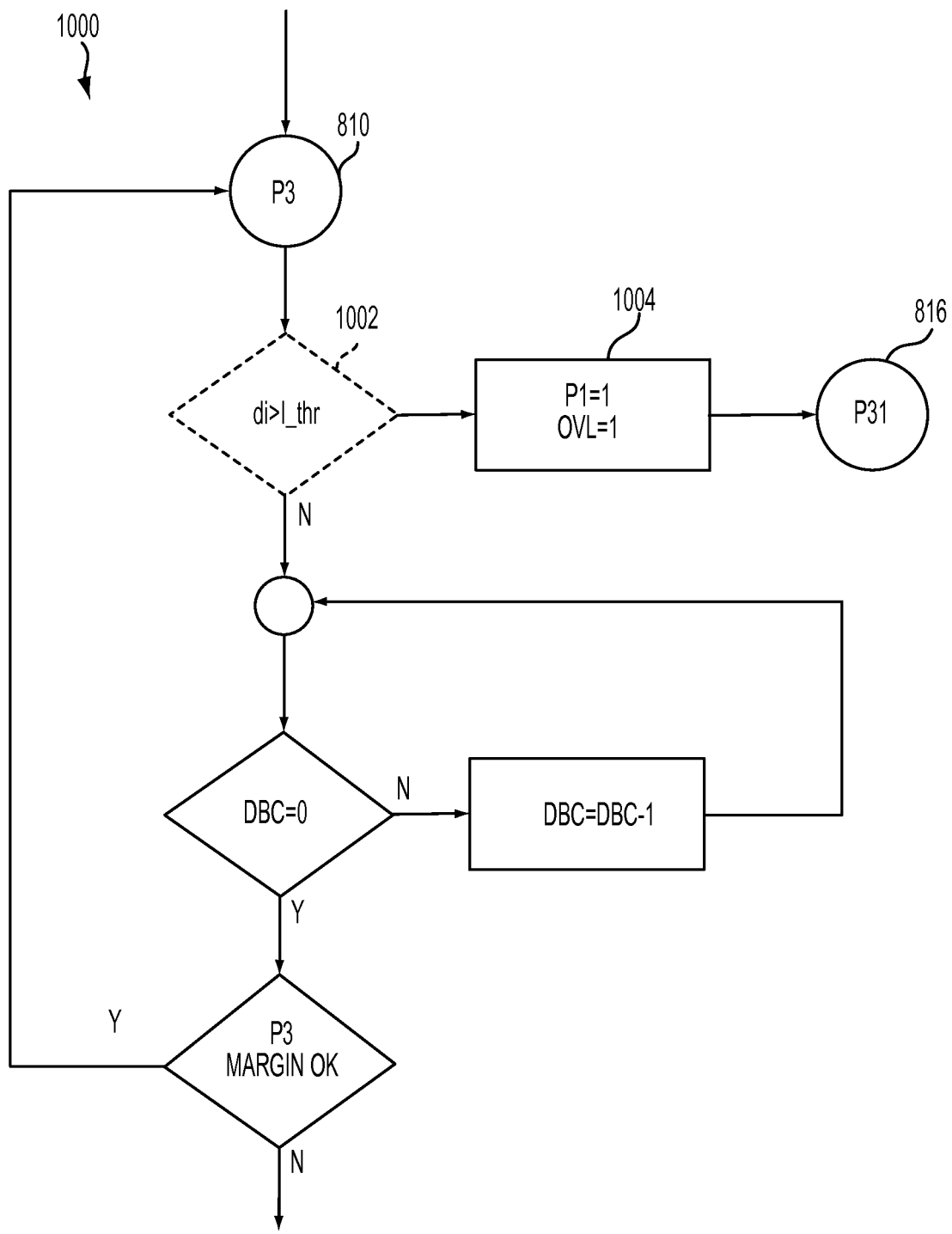
FIG. 10 is a flow chart illustrating a method of controlling a variable resistance device with reference current tracking according to one embodiment of the disclosure.

Additional modifications may be made to the method 800. For example, if the highest resistor is switched on and the current undergoes a positive step during the debounce delay period, then the drain voltage, $V_{drain}$, may collapse and cause the current, i, to be incorrect. The method 800 may be modified to track the present and the next values of the reference current. FIG. 10 is a flow chart illustrating a method of controlling a variable resistance device with reference current tracking according to one embodiment of the disclosure. Although the method of FIG. 10 is shown with reference to the state 810, P3, the method of FIG. 10 may be applied to operation in any state.

A method 1000 begins with operating in the state 810, P3. At block 1002 it is determined whether the step in current is larger than a certain threshold value. If so, the controller begins a switch to the lowest resistance mode, state 802, P1. The method 1000 may proceed to block 1004 to enable the transistor 512a and set an overlap value, OVL, to a low value, such as 1. Then, the transition state 816, P31, is carried out to complete the transition to the state 802, P1.

Figure 11:
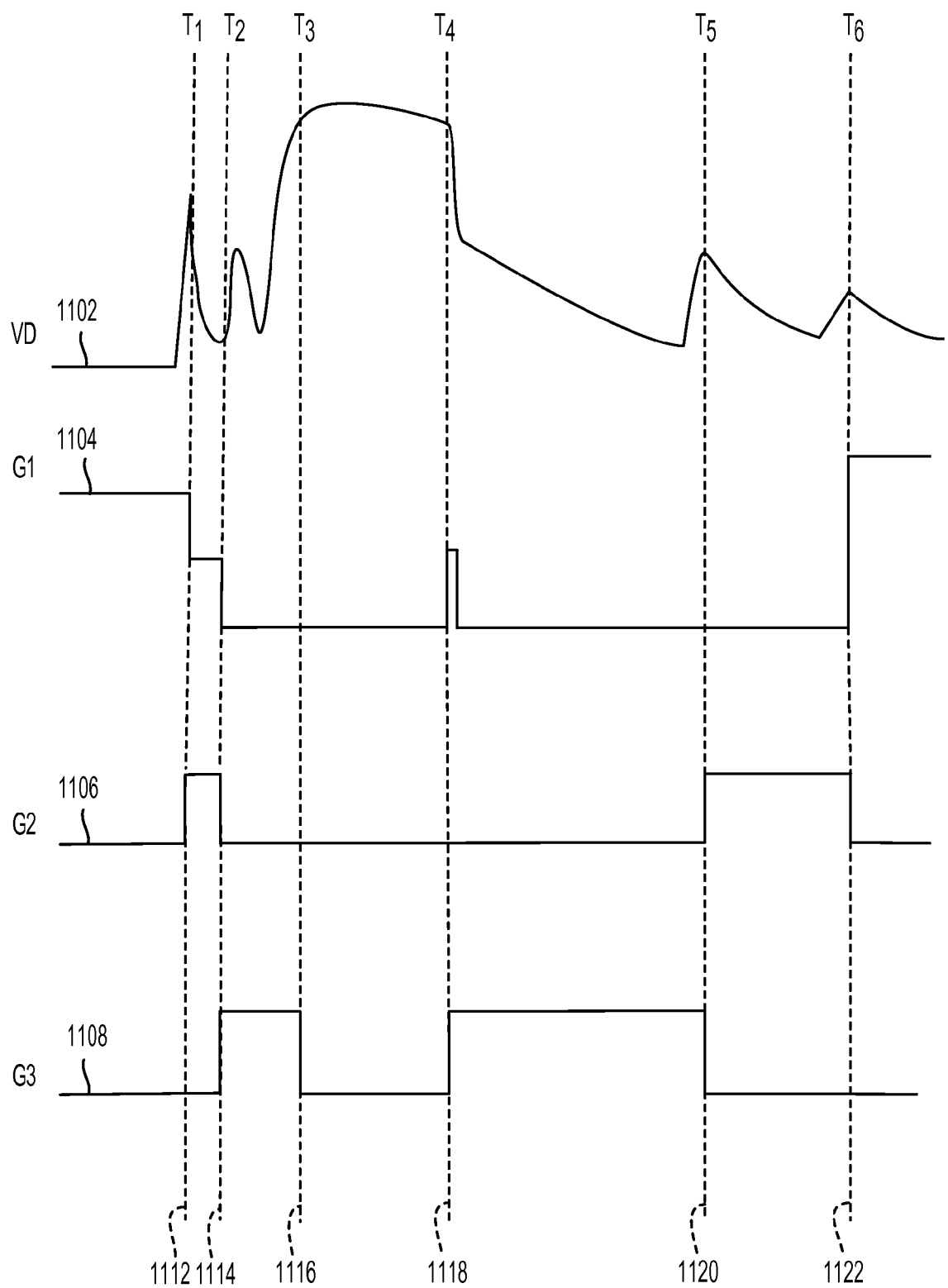
FIG. 11 is a graph of waveforms of control signals and a drain voltage according to one embodiment of the disclosure.

An example of the operation of the algorithm of FIGS. 8A-C is shown in waveform of FIG. 11. FIG. 11 is a graph of waveforms of control signals according to one embodiment of the disclosure. Waveform 1104, G1, waveform 1106, G2, and waveform 1108, G3, correspond to control signals applied to the gates of transistors 512a, 512b, and 512c, respectively. A drain voltage 1102, $V_d$, corresponds to a probe cycle in an LE dimmer with a conduction angle of approximately 90 degrees. The waveform 1104, G1, may start at a high level equal to the high comparator output (e.g., 12V) because the line voltage, $V_{line}$, cannot sustain a reference current. As the line voltage, $V_{line}$, increases, the current reaches the reference level and G1 settles to a DC value to produce the reference current. At time 1112, $t_1$, the controller transitions from state P1 to P2, and then, at time 1114, from state P2 to P3. When the current goes to approximately zero at time 1116, $t_3$, state P3 is exited. At time 1118, $t_4$, the current has a step causing the controller to revert to state P1, after which a direct transition to state P3 is initiated. At time 1120, $t_5$, the drain voltage 1102 approaches a lower threshold and the controller switches from state P3 to state P2. At time 1122, $t_6$, the threshold is reached again and the controller switches from state P2 to state P1. When the line voltage is near zero, the transistor 512a may be unable to sustain the desired current, so the comparator 606 output remains high and G1 follows, causing the transistor 512a to act as a resistor.

Figure 12:
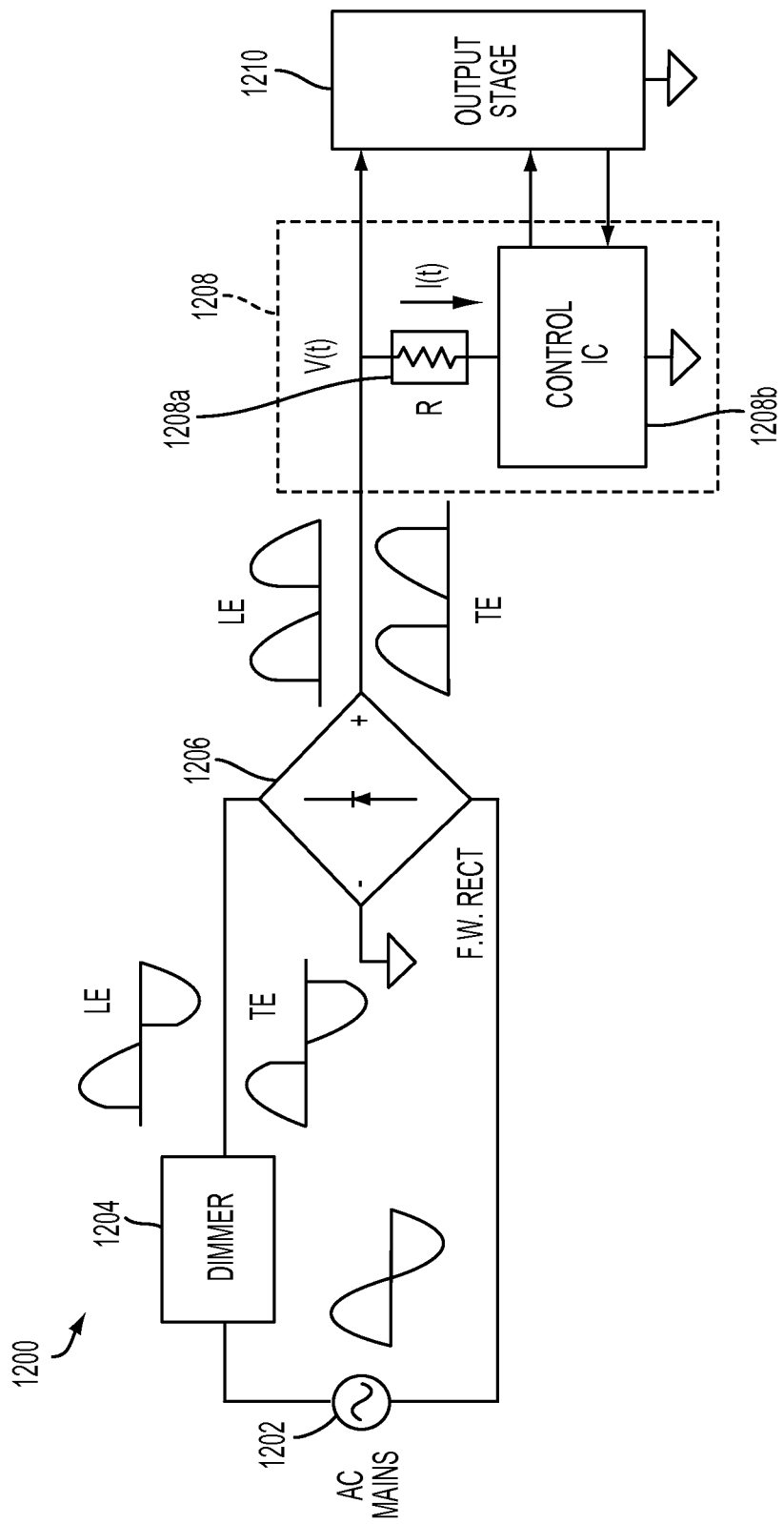
FIG. 12 is a block diagram illustrating a dimmer system with a variable resistance device according to one embodiment of the disclosure.

The controller and variable resistance load device described above may be integrated into a dimmer circuit to provide dimmer compatibility, such as with lighting devices. FIG. 12 is a block diagram illustrating a dimmer system with a variable resistance device according to one embodiment of the disclosure. A system 1200 may include a dimmer compatibility circuit 1208 with a variable resistance device 1208a and a control integrated circuit (IC) 1208b. The control IC 1208b may include, for example, the transistors 512a, 512b, and 512c of FIG. 5. The variable resistance device 1208a may include the resistors 514a, 514b, and 514c of FIG. 5. In certain embodiments, the transistors 512a, 512b, and 512c may be external to the control IC 1208b. The dimmer compatibility circuit 1208 may couple an input stage having a dimmer 1204 and a rectifier 1206 with an output stage 1210, which may include light emitting diodes (LEDs). The system 1200 may receive input from an AC mains line 1202.

If implemented in firmware and/or software, the functions described above, such as described with reference to FIGS. 7, 8, 9, and 10, may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus, comprising:
an input node;
a variable resistance device coupled to the input node and comprising at least a first resistor and a second resistor, wherein the variable resistance device is configured to dissipate power from the input node; and
an integrated circuit coupled to the variable resistance device, the integrated circuit comprising:
a drain voltage node;
a first switch coupled to the first resistor and coupled to the drain voltage node; and
a second switch coupled to the second resistor and coupled to the drain voltage node,
wherein the integrated circuit is configured to commutate among the first resistor and the second resistor with the first switch and the second switch, respectively, based, at least in part, on maintaining approximately a desired voltage at the drain voltage node.

2. The apparatus of claim 1, wherein the integrated circuit is further configured to select at least one of the first resistor and the second resistor to maintain a minimum voltage at the drain voltage node to operate a selected one of the first switch and the second switch as a current source.

3. The apparatus of claim 2, wherein the integrated circuit is configured to operate the first switch to enable the first resistor and to operate the second switch to enable the second resistor.

4. The apparatus of claim 2, wherein the first switch and the second switch each comprise a field effect transistor (FET).

5. The apparatus of claim 1, wherein the integrated circuit is configured to:
measure the first resistor and the second resistor, and
select at least one of the first resistor and the second resistor to maintain approximately a desired voltage at the drain voltage node based, at least in part, on the measured resistance of the first resistor and the second resistor.

6. The apparatus of claim 1, wherein the first resistor and the second resistor are coupled in series, and wherein the integrated circuit is configured to:
configure the variable resistance device for a first resistance having a value of the first resistor; and
configure the variable resistance device for a second resistance having a value of a sum of the value of the first resistor and a value of the second resistor.

7. The apparatus of claim 1, wherein the first resistor and the second resistor are coupled in parallel, and wherein the integrated circuit is configured to:

configure the variable resistance device for a first resistance having a value of the first resistor, and
configure the variable resistance device for a second resistance having a value of the second resistor.

8. The apparatus of claim 1, further comprising:
a dimmer coupled to an alternating current (AC) power source and configured to produce a dimmed voltage output; and
a rectifier coupled to the dimmer and configured to produce a rectified output voltage based on the dimmed voltage output,
wherein the dimmed voltage output is coupled to the input node,
wherein the variable resistance device is configured to act as a low impedance load of a fixed value when the dimmer is off, and
wherein the variable resistance device is configured to act as a programmable current sink when the dimmer is on.

9. The apparatus of claim 1, further comprising a plurality of resistors, wherein the integrated circuit is configured to select at least one of the plurality of resistors to maintain a desired voltage at the drain voltage node.

10. The apparatus of claim 1, wherein the integrated circuit is further configured:
to monitor at least one of a voltage at the drain voltage node and a reference current; and
to select at least one of the first resistor and the second resistor to maintain a desired voltage at a drain voltage node for the current sink based, at least in part, on at least one of a voltage at drain voltage node and the reference current.

11. The apparatus of claim 1, wherein the integrated circuit is integrated in a controller IC external from the variable resistance device.

12. A method, comprising:
receiving an input voltage from a power source;
decreasing the input voltage to an output voltage through a variable resistance device;
adjusting a resistance of the variable resistance device to maintain approximately a desired voltage at the output supply voltage by dissipating power through the variable resistance device by operating a plurality of switches within the variable resistance device to commutate among at least a first resistor and a second resistor.

13. The method of claim 12, wherein the step of adjusting the resistance of the variable resistance device comprises:
engaging a first resistor of the variable resistance device while a second resistor is engaged;
waiting an overlap time period after engaging the first resistor;
disengaging the second resistor after waiting the overlap time period; and
waiting a debounce period after disengaging the second resistor.

14. The method of claim 12, further comprising:
measuring a resistance of the first resistor and the second resistor; and
selecting at least one of the first resistor and the second resistor of the variable resistor module based, at least in part, on the measured resistance of the first resistor and the second resistor.

15. The method of claim 14, further comprising selecting the first resistor for the resistance of the variable resistance device based, at least in part, on at least one of an output voltage, an input voltage, and a reference current.

16. The method of claim 15, wherein the step of selecting the first resistor comprises:
predicting a drain voltage based on a current demand of the output voltage and the desired voltage; and
selecting at least one of the first resistor and the second resistor to maintain approximately the desired voltage.

17. The method of claim 12, wherein the desired voltage comprises a minimum drain voltage for maintaining a transistor operating as a current source.

18. The method of claim 12, wherein the step of adjusting the variable resistance device comprises distributing power dissipation between a transistor integrated in a dimmer control integrated circuit (IC) and the variable resistance device external to the dimmer control IC to reduce power dissipation within the dimmer control IC.

19. The method of claim 18, further comprising:
operating the variable resistance device as a low impedance load of fixed value when a dimmer coupled to the dimmer control IC is off; and
operating the variable resistance device as a programmable current sink when the dimmer is on.

20. The method of claim 12, wherein the step of adjusting is preformed by a controller IC external from the variable resistance device.

21. An apparatus, comprising:
an input node configured to receive a dimmed alternating current (AC) voltage;
an output node configured to provide an output voltage to at least one light emitting diode (LED);
a variable resistance device coupled to the input node and to the output node; and
an integrated circuit comprising a current sink and coupled to the variable resistance device, the integrated circuit configured to:
operate the variable resistance device as a low impedance load of fixed value when a dimmer coupled to the dimmer control IC is off; and
operate the variable resistance device as a programmable current sink when the dimmer is on.

22. The apparatus of claim 21, wherein the variable resistance device comprises at least two resistors of different resistances.

23. The apparatus of claim 22, wherein the controller is integrated in an integrated circuit (IC) and the at least two resistors is external to the integrated circuit.

* * * * *